United States Patent
Numrich et al.

(10) Patent No.: US 6,364,225 B1
(45) Date of Patent: Apr. 2, 2002

(54) METHOD AND DEVICE FOR PROCESSING AUTOMOBILE TIRES

(75) Inventors: Reiner Numrich; Gerhard Tewes, both of Borchen (DE)

(73) Assignee: Gebruder Lodige Maschinenbau-Gesellschaft mbH (DE)

( * ) Notice: Subject to any disclaimer, the term of this patent is extended or adjusted under 35 U.S.C. 154(b) by 0 days.

(21) Appl. No.: 09/582,567
(22) PCT Filed: Dec. 12, 1998
(86) PCT No.: PCT/DE98/03653
 § 371 Date: Jun. 27, 2000
 § 102(e) Date: Jun. 27, 2000
(87) PCT Pub. No.: WO99/33907
 PCT Pub. Date: Jul. 8, 1999

(30) Foreign Application Priority Data

Dec. 29, 1997 (DE) .......................... 197 57 794
Jan. 9, 1998 (DE) .......................... 198 00 567

(51) Int. Cl.⁷ ............................................. B02C 11/08
(52) U.S. Cl. ........................................ 241/23; 241/22
(58) Field of Search ................... 241/22, 23, DIG. 31

(56) References Cited

U.S. PATENT DOCUMENTS

| | | | |
|---|---|---|---|
| 4,084,521 A | 4/1978 | Herbold | |
| 4,240,587 A | 12/1980 | Letsch | |
| 4,308,103 A | 12/1981 | Rotter | |
| 5,084,141 A | 1/1992 | Holland | |
| 5,264,640 A | * 11/1993 | Platz | 241/DIG. 37 |
| 5,286,374 A | * 2/1994 | Cha | 208/400 |
| 5,369,215 A | * 11/1994 | Platz | 585/241 |
| 5,411,213 A | * 5/1995 | Just | 241/16 |
| 5,435,890 A | 7/1995 | Munger | |
| 5,504,267 A | 4/1996 | Platz | |
| 5,578,700 A | * 11/1996 | Hunt et al. | 241/23 |
| 5,836,524 A | * 11/1998 | Wang | 241/23 |
| 5,975,440 A | * 11/1999 | Watson | 241/18 |

FOREIGN PATENT DOCUMENTS

| | | |
|---|---|---|
| DE | 40 34 985 A1 | 5/1992 |
| DE | 42 34 385 A1 | 4/1994 |
| DE | 44 16 155 A1 | 11/1995 |
| DE | 196 17 450 A1 | 11/1997 |
| JP | 60130678 | 7/1985 |

OTHER PUBLICATIONS

Schmidt, U. and Kreipe, E. KGK Kautschuk Gummi Kunststoffe 48. Jahrgang, Nr. 4/95 pp. 244 to 253.

* cited by examiner

Primary Examiner—Ed Tolan
(74) Attorney, Agent, or Firm—Walter A. Hackler

(57) ABSTRACT

Product pieces (2) produced from old tires are thermally processed in a discontinually operated device (1). The product pieces (2) consist of a material compound, which comprises at least one material component which decomposes by heating, by mechanically moving and/or fluidizing the product pieces (2) in the device (1) and by heating to an material decomposition temperature via heated contact surfaces of the device (1). At this temperature the material compound decomposes in one or several solid matter material components and fluids, which can be taken out of the device (1) separately. A single component separation is made possible by the method and the use of the device. Environmental impact is mostly avoided.

10 Claims, 1 Drawing Sheet

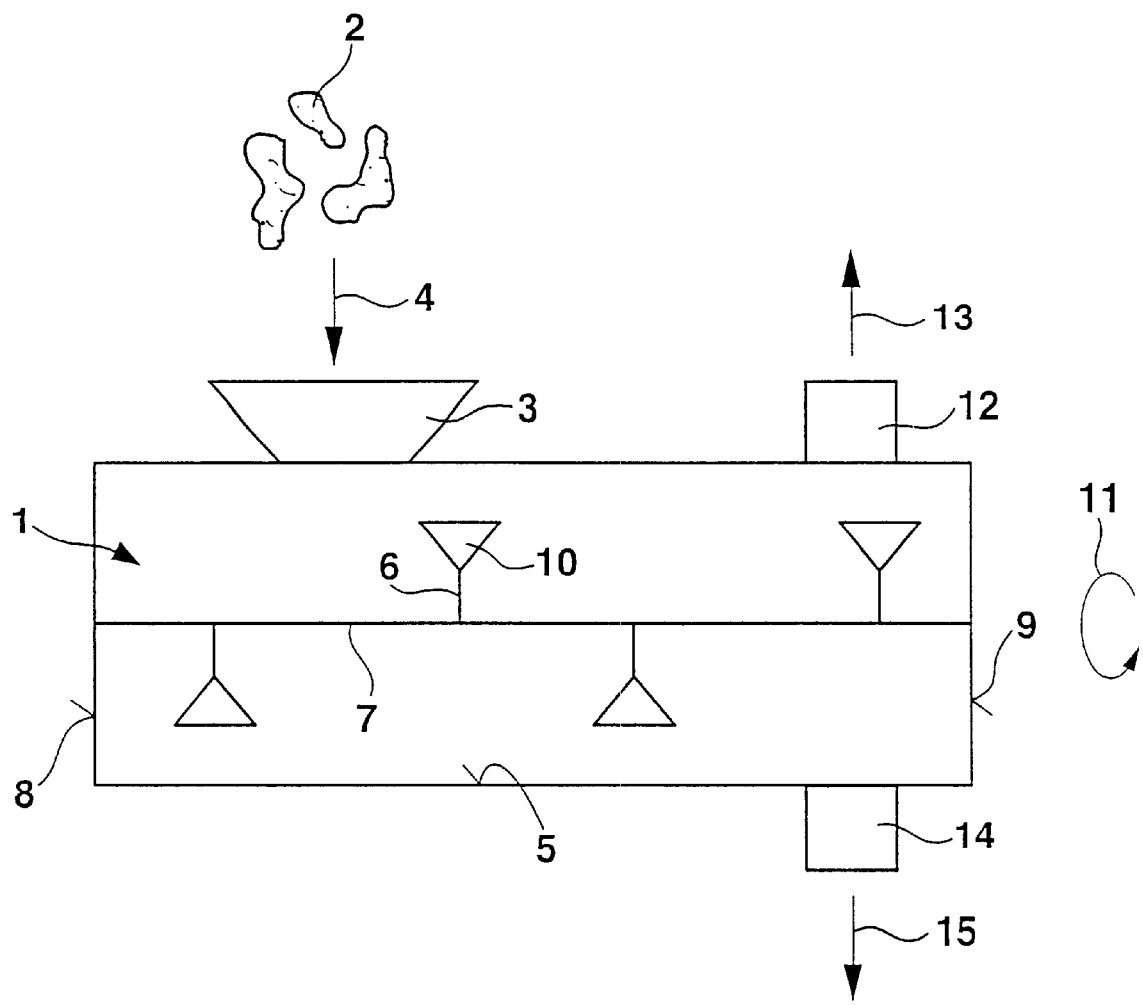

METHOD AND DEVICE FOR PROCESSING AUTOMOBILE TIRES

This application is a 35 USC 371 of PCT/DE98/03653, filed Dec. 12, 1998.

The invention concerns a method for the thermal processing of product pieces produced from old tires, which consist of a material compound, which comprises at least one material component which decomposes by heating, the processing occurring by mechanically moving and/or fluidizing the product pieces in a device and by heating the product pieces to a material decomposition temperature via heated contact surfaces of the device, at which temperature the material compound decomposes into one or several solid matter material components and fluids, which can be taken out of the device separately.

Such a processing became known by the U.S. Pat. No. 4,084,521. First, the old tires are cut into pieces, which are then dried. Then the pieces enter a reaction container in which they are heated to the material decomposition temperature during transport from entrance to exit. The reaction container is at subatmospheric pressure and sealed air-tight. The gases developing during the decomposition and the pieces not decomposed then enter a chamber, where they are separately carried off.

A method for the processing of old tires and similar materials is described in the U.S. Pat. No. 4,240,587. The associated device includes an installation for cooling tires of different sizes to a temperature where the rubber becomes brittle, such that a first part of recoverable rubber can be separated. The device is essentially operated with the re-usable by-products of the pyrolytic reduction of the tires, where hydrocarbons, heated gas and other commercially recoverable by-products form.

DE 40 34 985 teaches a method for the controlled low temperature degassing of pre-comminuted organic substances, preferably of old tires, plastics and biomass, with the emphasis on the recovery of fuel and raw materials by an electrically heated conveyor belt. DE 196 17 450 concerns a method and a device for the recovery of elastomers from waste material. For this purpose the waste material is introduced into an upstream chamber through a first lock for drying, when dried it is transferred in a retort chamber with reduced oxygen partial pressure and in there heated for dry distillation. The liquid distillate and the dry residue are drawn off. The residue enters a downstream chamber for the comminution and pulverization. Residue not pulverized or residue similar to granulates are carried out through a second lock.

The mechanical processing of vehicle tires which cannot be used anymore has become known, for example, by the DE 44 16 155 A1.

It became known that large wear occurs in rough comminution machines and in mills and that additionally the amount of throughput per unit of time is limited if old tires are fed into comminution machines. After the comminution or the milling, a material mixture from numerous components exists which have to be separated if a sensible reuse/recycling is intended. A separation is not possible for larger granulates because the individual granulates consist of an intimate material compound, which cannot be undone by simple means. That means that granulates in the most different material compositions can only be separated into individual material compounds via chemical processing.

In the chemical processing according to the state of the art, old tires or parts of old tires are processed by pyrolysis and/or depolymerization.

In the thermal processing of old tires, the heated and processed product pieces can adhere to or cake to the device inner walls and/or the mixing tools of the device provided for that purpose.

Therefore, the object of the invention is to further develop the known methods such that no such conglutinations can occur.

For the solution of the object it is proposed according to the invention, to discontinually operate the device in the thermal processing of old tires and to introduce the product pieces into a material pre-placement containing soot in the device inner space. The product pieces are powdered with soot and cannot permanently adhere to or cake to the device inner wall and/or the mixing tools.

One half of the starting material of the fed product pieces can be converted into gases and oil vapors. The other half of the treated starting material can be separated into low-value soot (carbon, sulfur) and steel wires. The developing gases can be used for generating energy. The condensed, relatively homogeneous oil can be further used as raw material. The soot comprising a high carbon content can be used for generating energy due to its calorific value. The steel salvaged from the vehicle tires can be again integrated into a product cycle as raw material.

The material pre-placement can consist of material components, which develop during the decomposition of the material compound of the product pieces. The fed starting material is, for example, mixed with the still warm soot in this embodiment. The device is not cooled down too much. The starting material is pre-heated by being in contact with the soot.

In a preferred development of the invention, the separation of the individual material components is obtained by heating up of the product pieces to a temperature of up to $T=500°$ C.

The efficiency of the method can be improved in that the thermal processing of the product pieces occurs under vacuum.

The purity of the generated end products can be improved if the thermal processing of the product pieces occurs under exclusion of oxygen.

For the application of the processing, a device is used according to the invention, which comprises installations and surfaces for the mechanical fluidization and/or movement and thermal treatment of product pieces provided in a device inner space, which product pieces are produced from old tires, for example from vehicles, by comminuting the old tires, where the product pieces consist of a material compound, which comprises at least one material component which decomposes by heating, with product contact surfaces of the device which can be heated up for the heating of the product pieces to a material decomposition temperature, with a connection or connections of the device for maintaining a vacuum in the device inner space, with a connection or connections of the device for feeding the product pieces into the device inner space, with a connection or connections of the device for feeding a gas into the product inner space and with a connection or connections of the device for the carrying off of a fluid or fluids and a solid material component or of solid material components, which result from the thermal treatment of the product pieces.

For example, the product pieces can be heated up to a temperature of up to $T=500°$ C. by contact heating via the device inner walls.

The mixing and comminution of the product pieces can be achieved by installations of the device, which are designed displaceably in a stationary housing of the device.

The installations of mixing elements can be disposed on a rotatable shaft in a variant of the device, which shaft runs on bearings at the ends of the device, where the shaft passes through the device and the mixing elements pass over the heated surfaces of the device.

It is clear that the above mentioned method and the corresponding device can also be used for the processing of thermally decomposable rubber and/or plastic waste from the production of vehicles.

Additional distinctions and advantages of the invention can be gathered from the description of an embodiment of the invention, the drawing, which shows details relevant to the invention, and from the claims. The individual characteristics can be realized each individually or collectively in any combination in an embodiment of the invention.

The FIGURE shows a device, by the use of which the inventive method can be performed.

The invention is schematically shown in the FIGURE, such that the essential features of the invention can be easily recognized. The presentation is not necessarily to be taken by scale.

In a discontinually operated device 1, product pieces 2, which are shred from old tires, can be separated into different recoverable raw materials by aid of a thermal treatment. The product pieces 2 could, for example, be supplied to a product inlet 3 of the device 1 in product inlet direction 4 in a controlled manner with respect to their size. Normally, the product pieces 2 are, however, weighed and supplied to the device 1 proportioned according to weight. First additional aggregates, not shown in the FIGURE, can be connected to the device 1, via which the product pieces 2 can be fed into the device inner space in a controlled manner proportioned according to weight and/or with respect to their size. The device 1 is operated in batch mode, however, a continuous operation would also be conceivable.

After supplying the product pieces 2, the device inner space of the device is evacuated to a coarse vacuum. Then, the device is heated up step by step. The product pieces 2 are heated up via the contact to a device inner wall 5 which is electrically heated.

Within the device 1 mixing elements 6 are provided, which are fixed to a shaft 7. The shaft 7 runs rotatable on bearings at ends 8 and 9 of the device 1. Hence, the mixing elements 6, which are provided with mixing tools (mixing paddles) 10, can rotate in direction of rotation 11. During the thermal processing of the product pieces 2, the mixing elements 6 are operated in the Froude number range between $F_r=1$ and $F_r=7$, where $F_r=(n/n_c)^2$ and n and $n_c$ are as follows: $n_c$=critical number of revolutions (1/s) and n=number of revolutions of the mixing elements (1/s) and $F_r=(m \cdot \omega^2 \cdot r)/(m \cdot g)$.

During the treatment process, a mechanical fluid bed is generated, such that as many product pieces 2 as possible get in contact with the heated device inner wall 5. Soot in form of fine micro granulates from carbon develops due to the mechanical fluid bed, which does not dissolve in the condensed oil phase and which can be separated, for example by centrifuging, without any problems.

Specific mixing tools 10 prevent the winding into balls of the steel threads released from the product pieces 2. The mixing tools 10 exhibit round surfaces, such that the steel threads slip and cannot stick to the surfaces of the mixing tools 10.

At a temperature of about 380° C. to 420° C. within the device 1, decomposition processes commence. With the temperature being kept constant, gases, fluids and vapors can be carried off via a gas outlet 12 in outlet direction 13.

At the same time, the product temperature of the product pieces 2 rises. When an upper temperature limit is reached, which can be registered by one or several temperature sensors provided in the device 1, the thermal treatment is stopped.

The device 1 is flooded with nitrogen, such that the vacuum is given up by adjustment to the ambient pressure.

The material components forming in the thermal processing of the product pieces 2 can be taken out of the device 1, proportioned according to weight, via a raw material outlet 14 in the outlet direction 15. Two additional aggregates can be provided at the device 1, via which aggregates the material components can be drawn out of the device inner space proportioned according to weight (weighing cells), which material components form in the thermal treatment of the product pieces 2.

After finishing the treatment of a first batch of product pieces 2, the device 1 is only partially emptied. New product pieces 2 are mixed with still warm soot during filling. The device 1 does not cool down too much. The new product pieces 2 are pre-heated by contact with the soot.

The product pieces 2 are powdered with soot and cannot permanently adhere to or cake together on the device inner wall 5 and/or on the mixing tools. Conglutination is avoided. A good separation into the individual raw materials is made possible. Alternatively, carbon in form of dust can be pre-placed into the device inner space in a first operating mode, for the product pieces 2 being mixed with the carbon during heating up.

The device could also be operated on the Froude number range between $F_r=1$ and $F_r=7$ during the thermal processing of the product pieces in another embodiment, for example if the device is designed as rotatable drum.

What is claimed is:

1. Thermal processing of product pieces produced from old tires, which consist of a material compound, which comprises at least one material component which decomposes by heating the method, comprising the steps of:

a) introducing of a material pre-placement containing soot into an inner space of a device operated in batch mode;

b) introducing the product pieces into the material pre-placement;

c) processing said product pieces by mechanically moving and/or fluidizing the product pieces in the device and by heating the product pieces to a material decomposition temperature via heated contact surfaces of the device, at which temperature the material compound decomposes into one or several solid mater material components and fluids;

d) partially employing the device, thus leaving a material pre-placement containing soot for the next batch; and e) repeating from step b).

2. Method according to claim 1, wherein the material pre-placement consists of material components, which result from the decomposition of the material compound of the product pieces.

3. Method according to claim 1, wherein the product pieces are heated to a temperature of up to T=500° C.

4. Method according to claim 1, wherein the thermal processing of the product pieces occurs under a vacuum in the device.

5. Method according to claim 1, wherein that the thermal processing of the product pieces occurs under the exclusion of oxygen.

6. A method of thermal processing of product pieces produced from old tires, which consist of a material compound, which comprises at least one material component which decomposes by heating the method, comprising the steps of:

a) introducing of the product pieces into a material pre-placement containing soot left in an inner space of a device operated in batch mode from a previous run;

b) processing said product pieces by mechanically moving and/or fluidizing the product pieces in the device and by heating the product pieces to a material decomposition temperature via heated contact surfaces of the device at which temperature the material compound decomposes into one or several solid matter material components and fluids; and c) partially emptying the device, thus leaving a material pre-placement containing soot a next batch.

7. Method according to claim 6 wherein the material pre-placement consists of material components, which result from the decomposition of the material compound of the product pieces.

8. Method according to claim 6 wherein the product pieces are heated to a temperature of up to T=500° C.

9. Method according to claim 6 wherein the thermal processing of the product pieces occurs under a vacuum in the device.

10. Method according to claim 9 wherein the thermal processing of the product pieces occurs under the exclusion of oxygen.

* * * * *